US012560580B2

(12) United States Patent
Tanner et al.

(10) Patent No.: US 12,560,580 B2
(45) Date of Patent: Feb. 24, 2026

(54) ACOUSTIC ANALYSIS OF REMOTE STRUCTURES WITHIN A MEDIUM

(71) Applicant: Cereus Ultrasonics Limited, Aberdeen (GB)

(72) Inventors: Mark Tanner, Wimborne (GB); Paul Easton, Portland (GB); Max Hadley, Lyndhurst (GB)

(73) Assignee: Cereus Ultrasonics Limited, Aberdeen (GB)

( * ) Notice: Subject to any disclaimer, the term of this patent is extended or adjusted under 35 U.S.C. 154(b) by 276 days.

(21) Appl. No.: 18/547,308

(22) PCT Filed: Feb. 21, 2022

(86) PCT No.: PCT/GB2022/050474
§ 371 (c)(1),
(2) Date: Aug. 21, 2023

(87) PCT Pub. No.: WO2022/175692
PCT Pub. Date: Aug. 25, 2022

(65) Prior Publication Data
US 2024/0133847 A1 Apr. 25, 2024

(30) Foreign Application Priority Data
Feb. 22, 2021 (GB) ...................................... 2102492

(51) Int. Cl.
*G01N 29/32* (2006.01)
*G01N 29/07* (2006.01)
G01N 29/28 (2006.01)
(52) U.S. Cl.
CPC ............. *G01N 29/32* (2013.01); *G01N 29/07* (2013.01); *G01N 29/28* (2013.01); *G01N 2291/0231* (2013.01); *G01N 2291/0289* (2013.01)

(58) Field of Classification Search
CPC ........ G01N 29/32; G01N 29/07; G01N 29/28; G01N 2291/0231; G01N 2291/0289;
(Continued)

(56) References Cited

U.S. PATENT DOCUMENTS 3,309,914 A     3/1967  Weighart
3,924,454 A  *  12/1975  McElroy .............. G01N 29/348
                                                      73/612

(Continued)

OTHER PUBLICATIONS

International search report and written opinion from corresponding PCT Application No. PCT/GB2022/050474, dated Apr. 25, 2022.

*Primary Examiner* — Tarun Sinha
(74) *Attorney, Agent, or Firm* — Scale LLP

(57) ABSTRACT

A device and method for analyzing structures within a medium. The device may include: at least one acoustic signal transmitter and acoustic signal receiver configured to output an acoustic signal and to receive an acoustic signal; an analyzer configured to analyze received acoustic data; a signal modifier configured to modify the acoustic signal of the acoustic signal transmitter or acoustic signal receiver; and control circuitry for controlling analysis of the structure. The control circuitry is configured to: initiate analysis of a first portion of the structure by controlling the signal modifier to apply a signal modification to the transmitter or the receiver to modify respective acoustic signals according to first modification data; and initiate analysis of a second portion of the structure by controlling the signal modifier to apply a signal modification to the transmitter or the receiver to modify respective acoustic signals according to second modification data.

20 Claims, 8 Drawing Sheets

(58) Field of Classification Search

CPC ....... G01N 2291/044; G01N 2291/048; G01N 2291/101; G01N 2291/102; G01N 29/346; G01N 29/40; G01N 29/4463; G01N 29/04; G01N 29/34; G01N 29/44; G01H 3/00; G01V 1/44

See application file for complete search history.

(56) References Cited

U.S. PATENT DOCUMENTS

| | | | |
|---|---|---|---|
| 4,098,130 A | | 7/1978 | Coffey et al. |
| 4,700,574 A | | 10/1987 | Turbe |
| 5,143,072 A | * | 9/1992 | Kantorovich ............ G01H 5/00 |
| | | | 73/598 |
| 5,280,723 A | | 1/1994 | Aharoni et al. |
| 5,303,590 A | | 4/1994 | Modderman et al. |
| 2010/0083751 A1 | * | 4/2010 | Boersig ............... G01F 23/2967 |
| | | | 73/290 V |
| 2011/0011891 A9 | | 1/2011 | Hettinga |
| 2011/0118991 A1 | * | 5/2011 | Lepage .............. G01N 29/4463 |
| | | | 702/39 |
| 2018/0328897 A1 | | 11/2018 | Guibert |

* cited by examiner

22

321 kHz = 25.0°

666 kHz = 12.0°

22

150 kHz = 55.2°

1100 kHz = 7.23°

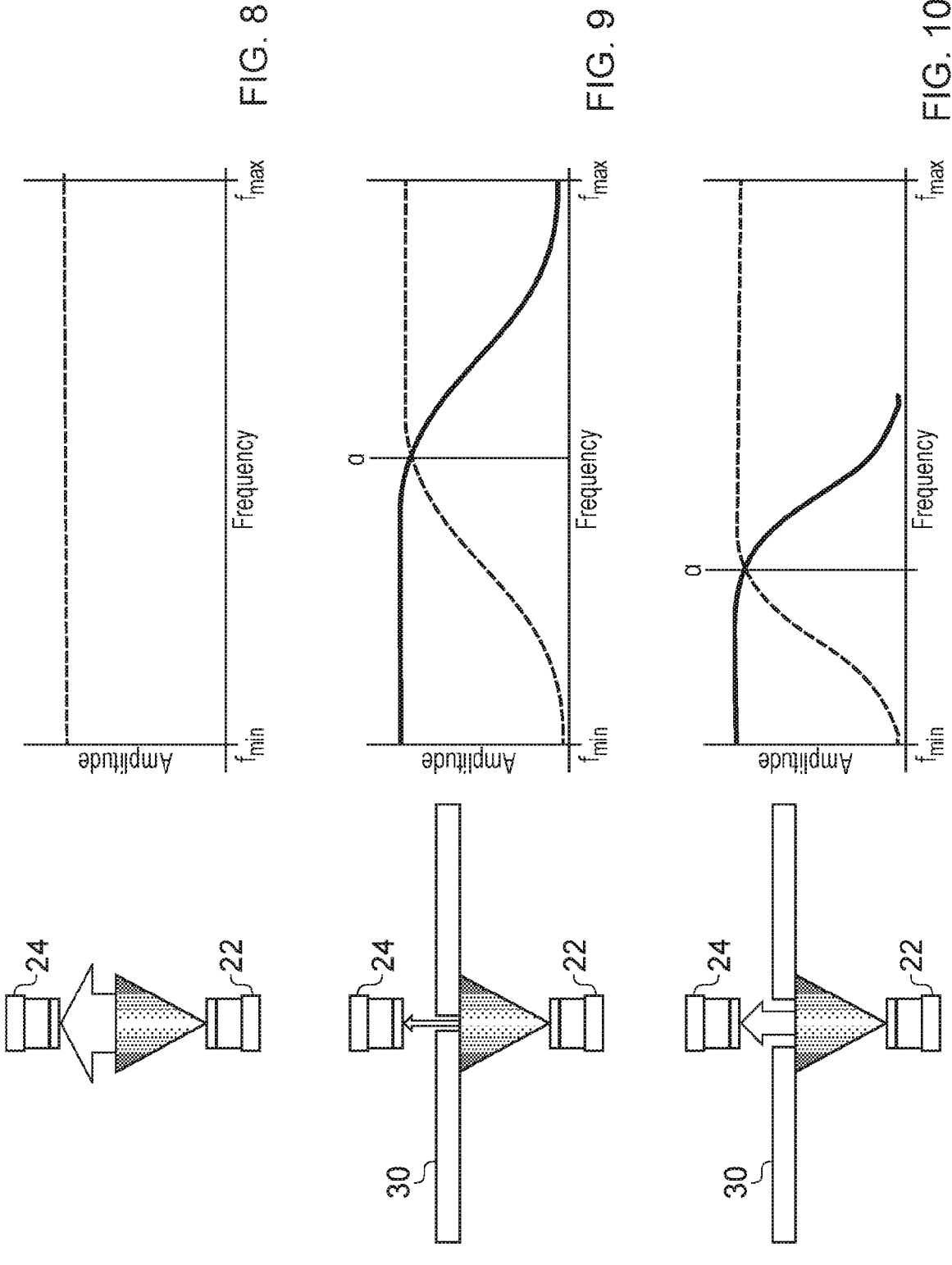

Continuous wave sinusoid

Single sinusoid

Half single sinusoid

Sinc (sin (x/x))

Arbitrary

1

ACOUSTIC ANALYSIS OF REMOTE STRUCTURES WITHIN A MEDIUM

CROSS-REFERENCE TO RELATED APPLICATION(S)

This application is a National Stage under 35 U.S.C. § 371 of International Application No. PCT/GB2022/050474, filed Feb. 21, 2022, which claims priority to United Kingdom Patent Application No. 2102492.2A, filed on Feb. 22, 2021, entitled "Accoustic analysis of remote structures within a medium," the contents of all of which are incorporated by reference in its entirety.

TECHNICAL FIELD

The field of the disclosure relates to the analysis of structures using electro-acoustic techniques.

BACKGROUND

Electro-acoustic techniques may be used to analyse remote targets or structures within a medium such as a fluid. An electrical signal supplied to a transducer generates an acoustic signal which travels through the medium to the remote structure, the acoustic signal after it has interacted with the structure is received at a transducer and distortions or perturbations in the signal are analysed these being indicative of the composition of the remote target or structure.

The signals generated and received are not only distorted by the target, imperfections in the transmitter, receiver and the medium through which they travel also have an effect. These distortions degrade the signal and render accurate analysis of the remote target more difficult as it is difficult to separate this degradation from the distortions generated by interaction with the structure.

Techniques which reduce distortions generated by the transmitter and receiver are known and may involve both hardware and software techniques which seek to filter out the distortions caused by the transducers themselves, so that in the absence of a remote target the signal at the receiver resembles that transmitted by the transmitter.

Although these techniques may reduce the degradation of the signal further difficulties for accurate analysis may arise, particularly where the target is a complex structure, that is one with several parts or layers. With such a complex structure identifying the distortions due to the different parts of the structure can be challenging.

It would be desirable to be able to improve the analysis of a remote complex structure within a medium such as a fluid.

SUMMARY OF THE DISCLOSURE

A first aspect provides a device for analysing complex structures within a medium, said device comprising: at least one acoustic signal transmitter and acoustic signal receiver configured to output an acoustic signal and to receive an acoustic signal; an analyser configured to analyse received acoustic data; a signal modifier configured to modify at least one of a phase and amplitude of said acoustic signal at at least one of said acoustic signal transmitter and acoustic signal receiver; control circuitry for controlling analysis of said complex structure, said control circuitry being configured to: initiate analysis of a first portion of said complex structure by controlling said signal modifier to apply a signal modification to at least one of said acoustic signal transmitter and acoustic signal receiver to modify an acoustic signal according to first modification data; and initiate analysis of a further portion of said complex structure by controlling said signal modifier to apply a signal modification to at least one of said acoustic signal transmitter and acoustic signal receiver to modify an acoustic signal according to further modification data.

The inventors recognised that signal modification techniques similar to those that might be used to apply modifications to the analysing signal to remove or at least reduce the distortions due to the transmitting/receiving devices and/or the transmission medium might also be used to reduce distortions due to particular portions of a complex structure, rendering these portions acoustically transparent or at least less significant such that distortions in the signal due to other parts of the structure become more prevalent in the signal to be analysed allowing these parts to be analysed. In effect signal modification can be used to nullify or at least reduce the distortions in the signal due to one part of a complex structure, so that the remaining distortions are due to a further part of the complex structure. This allows the different parts of the complex structure to be analysed independently.

It should be noted that the first modification data applied to the signal may be data taken from a data store which has been determined during calibration steps and may provide modifications to compensate for distortions generated by the hardware of the system and the environment or transmission medium in which the structure is situated. The further modification data may also be from a data store and/or it may be derived from the first analysis.

Although the signal modification may be applied to one of the acoustic signal transmitter or acoustic signal receiver, in some embodiments, the signal modification is applied to both such that both the transmitted and received signal receive a portion of the modification according to the particular modification data being applied.

In some embodiments, said further modification data is configured to mitigate for distortions of said acoustic signal caused by said first portion of said structure.

Mitigating for distortions due to the first portion of the structure allows the further portion of the structure to be analysed independently of the first portion by rendering the first portion in some cases acoustically transparent. This may in some embodiments allow the structures beyond the first portion to be analysed by allowing the analyser to be rendered insensitive to the first portion. The modification data necessary to mitigate for these distortions may be generated in response to the results of the first analysis or they may be generated in response both to the results of the first analysis and some prior knowledge of the structure. Thus, in some cases it may be known that the complex structure has multiple layers and that these layers are formed of particular materials but the thickness of the materials and any defects may not be known, alternatively, the thickness of the layers may be known and not the materials. These unknown details may be deduced from the first analysis and subsequent modification data determined which when applied to the signal compensates for and in effect removes or at least reduces distortions due to the already analysed portion(s) from the received signal. This process can be repeated as different layers or portions of the structure are determined.

In some embodiments, said control circuitry is configured to control analysis of a plurality of further portions of said structure by controlling said signal modifier to apply a signal modification to at least one of said acoustic signal transmitter and acoustic signal receiver to modify an acoustic signal according to a plurality of different modification data.

The technique of analysing first one portion and then a further portion may be applied to a plurality of different portions such that each layer may in turn be compensated for by modification in the signal allowing subsequent layers to be analysed accurately.

Although signal modifications may comprise a modification in one of an amplitude or a phase of the acoustic signal in some embodiments said signal modifications comprise modifications of both said amplitude and said phase of said acoustic signal.

In some embodiments, said control circuitry is configured to control said acoustic signal transmitter to generate a first acoustic signal within a first frequency bandwidth during analysis of said first portion of said complex structure; and control said acoustic signal transmitter to generate a further acoustic signal within a further frequency bandwidth during analysis of said further portion of said complex structure.

In addition to changing the modification data applied, in some cases the frequency bandwidth may also be changed when analysing different portions of the complex structure. In this regard, the frequency band that is suitable for accurate analysis of one portion may depend on the thickness of that portion for example, as the thickness of the structure will affect the resonant frequencies. Where the bandwidth comprises a frequency that is a resonant frequency for the thickness of that portion of the structure then the interaction between the signal and the structure will be higher than where this is not the case and thus, analysis may be more accurate. Resonant frequencies within a reflected signal and indeed frequencies missing from a reflected or transmitted signal will be indicative of thicknesses of components of the structure, with some frequencies passing through and others being reflected.

The pulse width or duration of any acoustic signal may also be shortened where resonant frequencies are used as the interaction is greater and more information can be gleaned. Furthermore, if a higher resonant frequency is selected the pulse width or duration may also be reduced.

In some embodiments, said analyser is configured to identify an interface within said complex structure from a reflected signal and to determine a nature of said interface from whether said reflected signal has an amplitude inversion or not.

Another indicator of a property of a structure may be amplitude inversion of the waveform of the reflected signal. In this regard, certain interfaces may generate an amplitude inversion when reflecting a signal while other surfaces may not. Thus, the presence of an amplitude inversion may indicate whether an interface is wet or dry which may be critical within the oil and gas sector for example as this can be indicative of the disbondment of coatings on tubing surfaces.

In some embodiments, said control circuitry is configured to generate a sinc pulse as an initial waveform to be transmitted by said transmitter prior to any signal modifications.

A sinc pulse is a well defined signal which shows inversion clearly and thus, may be an appropriate waveform for analysing for certain interfaces and other features.

In some embodiments, said analyser is configured to analyse said received acoustic data to determine at least one of a frequency bandwidth of a signal transmitted through a portion of said complex structure and a frequency bandwidth of a signal reflected by said structure, and to determine a size of a defect or hole in dependence upon said at least one of said transmitted and received frequency bandwidths.

In some embodiments the determination of a frequency bandwidth of the transmitted and/or reflected signal may be used for determining the size or cross sectional area of a defect. The inventors recognised that were a relatively wide frequency bandwidth used for the analysing signal then the higher frequencies within the bandwidth will be concentrated towards the centre of the beam with the lower frequencies towards the outer edge. This property means that by suitable analysis of the frequency of the signals that are transmitted and those that are reflected an indication of a size of a hole or defect can be derived. In this regard, in some embodiments both the reflected and transmitted bandwidths are detected while in others one may be detected and the other deduced.

In some embodiments, said analyser is configured to analyse a signal reflected by said structure and to determine a depth of said defect in dependence upon at least one of a time taken for different portions of said reflected signal to be received and a phase response of said reflected signal.

Where there is a defect then a time delay in the receipt of different frequencies in the signal will be indicative of the depth of the defect. If the reflected signal is analysed in the phase domain then the phase delay or group delay may be determined to provide an accurate indication of the depth.

In some embodiments, said analyser is configured to determine both a depth and an area of said defect in dependence upon a time delay or a phase response of said reflected signal and a frequency bandwidth of said different portions of said reflected signal.

In some embodiments, said control circuitry is configured to initiate analysis of said first portion of said complex structure by inputting a first pulse waveform to said transmitter as a basis for generating a first acoustic signal; and initiate analysis of said further portion of said complex structure by inputting a further pulse waveform to said transmitter as a basis for generating a further acoustic signal said further pulse waveform being different to said first pulse waveform.

An additional means of differentially analysing different portions of a complex structure may be to use different pulse waveforms for the analysis of the different parts of the structure. In this regard, different modification data may be used to focus on particular portions of the structure. This differently modified data may also be given a different frequency bandwidth appropriate to the estimated dimensions of that particular portion and a different pulse waveform depending on whether greater fidelity or higher energy is estimated to be required. Where the surface is rough then a higher energy pulse may be required, such as a chirp, as there may be a high scatter while where the surface is clean then a pulse such as a sinc pulse may be preferred.

A second aspect provides a method of analysing a structure within a medium comprising: transmitting a first acoustic signal towards said structure through said medium; receiving said first acoustic signal; modifying at least one of a phase or amplitude of said first acoustic signal at at least one of said transmitter and said receiver by applying first modification data; and analysing a first portion of said complex structure by analysing said distorted signal; and transmitting a further acoustic signal towards said structure through said medium; receiving said further acoustic signal; modifying at least one of a phase or amplitude of said further acoustic signal at at least one of said transmitter and said receiver by applying further modification data; and analysing a further portion of said complex structure by analysing said distorted signal.

In some embodiments, said steps of modifying at least one of a phase or amplitude of said first or further acoustic signal comprises modifying both said phase and amplitude.

In some embodiments, said steps of modifying at least one of a phase or amplitude of said first or further acoustic signal at at least one of said transmitter and said receiver, comprises modifying at least one of a phase or amplitude of said first or further acoustic signal at both of said transmitter and said receiver.

In some embodiments, said further modification data is configured to mitigate for distortions of said acoustic signal caused by said first portion of said structure.

In some embodiments, said method comprises further steps of applying further modification data to at least one of said acoustic signal transmitter and acoustic signal receiver to analyse further portions of said structure.

In some embodiments, said first acoustic signal is generated within a first frequency bandwidth during analysis of said first portion of said complex structure; and said further acoustic signal is generated within a further frequency bandwidth during analysis of said further portion of said complex structure.

In some embodiments, said step of analysing comprises identifying an interface within said complex structure from a reflected signal and determining a nature of said interface from whether said reflected signal has an amplitude inversion or not.

In some embodiments, said method comprises: determining a size of a defect within said structure from at least one of a frequency bandwidth of a signal reflected by said structure and transmitted through said structure.

In some embodiments, said method comprises: determining a depth said defect in dependence upon at lease one of a time taken for different portions of said reflected signal to be received and a phase response of said reflected signal.

In some embodiments, said method comprises: determining both a depth and an area of said defect in dependence upon a time delay or a phase response of said reflected signal and a frequency bandwidth of said different portions of said reflected signal.

In some embodiments, said method comprises: initiating analysis of said first portion of said complex structure by inputting a first pulse waveform to said transmitter as a basis for generating said first acoustic signal; and initiating analysis of said further portion of said complex structure by inputting a further pulse waveform to said transmitter as a basis for generating said further acoustic signal, said first pulse waveform being different to said further pulse waveform.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present disclosure will now be described further, with reference to the accompanying drawings, in which:

FIG. 8 shows a received bandwidth of a signal with no structure between transmitter and receiver;

FIG. 9 shows the effects of a small hole in the structure;

FIG. 10 shows the effects of a larger hole in the structure;

DETAILED DESCRIPTION

Before discussing the embodiments in any more detail, first an overview will be provided.

Signal modification techniques can be used to introduce compensating distortions into the signals at one or more of the transmitter and receiver in an acoustic analysing device such that the distortions due to both the transmitter and receiver and the intermediate medium can be compensated for and the signal at the receiver without a target in place will be substantially that input to the transmitter. Embodiments take such signal modification techniques one step further, such that the compensating distortion or signal modification applied to the receiver and/or transmitter is configured to compensate not only for the devices and the transmission medium but also for different parts of the structure being analysed. Thus, different signal modifications or distortions may be applied to the signal at transmission and/or reception to compensate for the distortions that different parts of the target will generate in the signal and thereby render these parts of the target acoustically transparent and in effect focus on a further part of the structure, allowing the different parts of the structure to be independently analysed.

Figure 1:
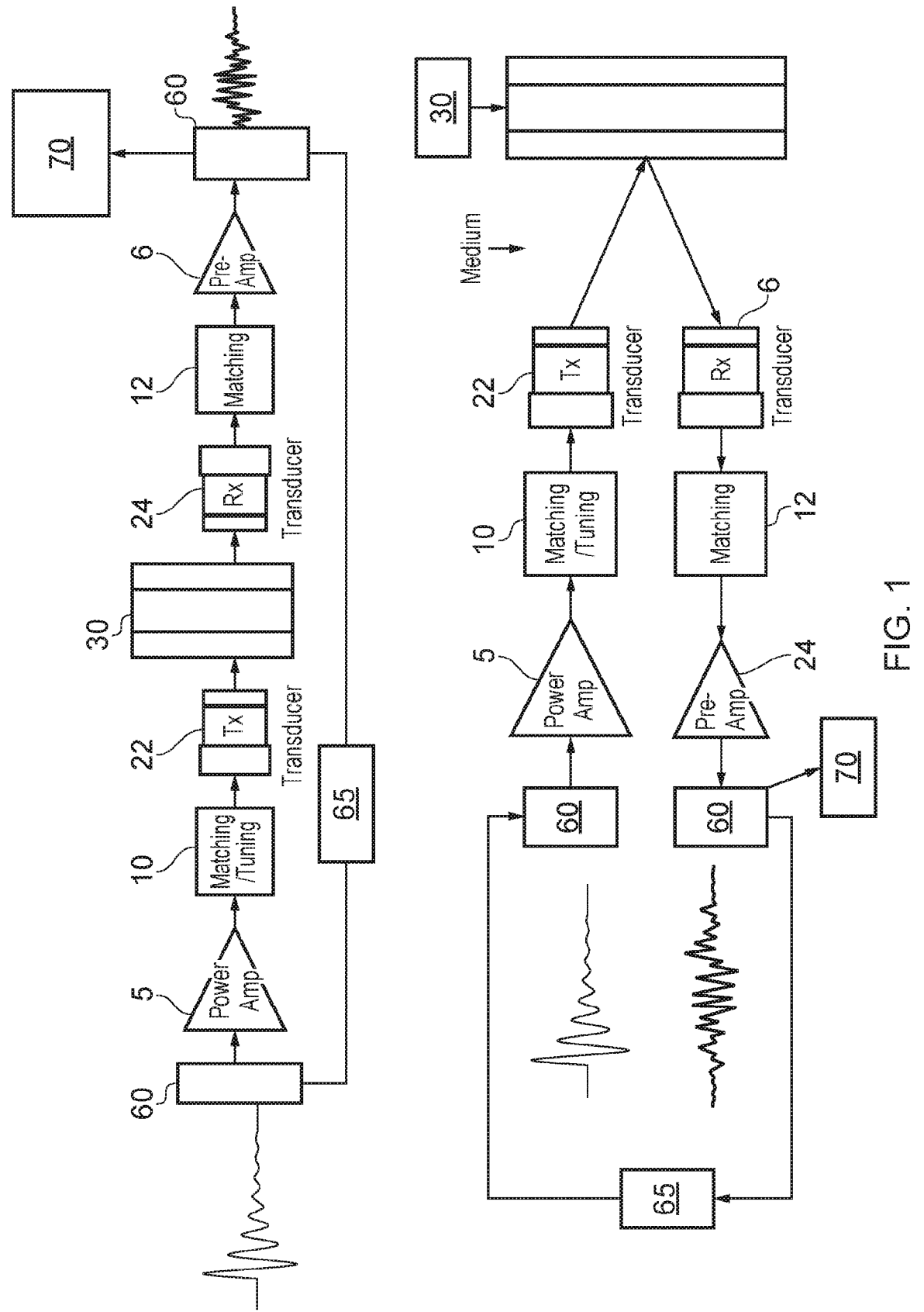
FIG. 1 shows analysing devices according to embodiments.

FIG. 1 shows two embodiments of an analysing device in the bistatic form where the transmitter and receiver are different devices and in the upper figure lie on either side of the complex structure 30 to be analysed while in the lower figure lie on the same side, the receiver receiving signals reflected from the different interfaces of the complex structure.

The devices each comprises a transmitting transducer 22 which produces an acoustic signal for transmission through a medium which contains the target structure 30 to be analysed. Receiving transducer 24 receives the signal and outputs the signal to electronics associated with the receiver. In this embodiment, these electronics include matching circuitry 12 and a pre-amplifier 6 which are designed to increase the energy of the received signal and reduce noise. The transmitting transducer 22 comprises similar hardware associated with it, that is a matching tuning circuitry 10 and a power amplifier 5. Again these are designed to amplify the signal and to reduce noise in the signal and are optional but do improve performance.

The devices also comprise signal modifiers 60 which in this embodiment are configured to modify both the transmitted and the received signals and control circuitry 65 configured to control the operation of the device. The devices also comprise analysing circuitry 70 configured to receive the signal following modification by signal modifier 60 and analyse it.

In the embodiments of FIG. 1 control circuitry 65 controls signal modifier circuitry 60 to apply a first signal modification to the electrical signals at both the transmitter and receiver, the applied modifications being configured to compensate for and thereby reduce distortions generated in the acoustic signal by both the hardware and the medium that the target structure 30 is located within. The aim of this modification is so that the received signal would closely resemble the signal input to the transmitter were the structure 30 not in place. Thus, any distortions in the signal are principally due to the structure 30. The received signal is sent to analyser 70 which determines information regarding structure 30 from this received signal. Structure 30 is a complex structure with several layers and this information may relate principally to the interaction of the signal with the first layer of the complex structure that the signal impacts.

Control circuitry 65 then controls signal modifiers 60 to apply a different modification to the transmitted and received signal. This different modification seeks to additionally compensate for the distortions that were generated by the first layer of the target 30 during the first analysis. In this regard, in some embodiments, analyser 70 has information regarding an expected form of structure 30 and this may be used in conjunction with the received signal to determine the structure in more detail and to determine details of the first layer and what the perturbations due to this layer were. This information is then used to generate modification data that compensates for these perturbations, allowing the other parts of the structure to be analysed. In some embodiments, in addition to applying a different modification to the signal, the bandwidth of the signal may also be changed to be relevant for the subsequent layers of the complex structure which may be formed of different material and/or have a different thickness. In this regard, the frequency of the analysing acoustic signal will interact to a greater degree with the targeted portion of the structure where the structure has a dimension close to a resonant frequency. Thus, changing the frequency bandwidth of the signal may help in improving analysis of different portions of the complex structure 30.

Figures 2, 3:
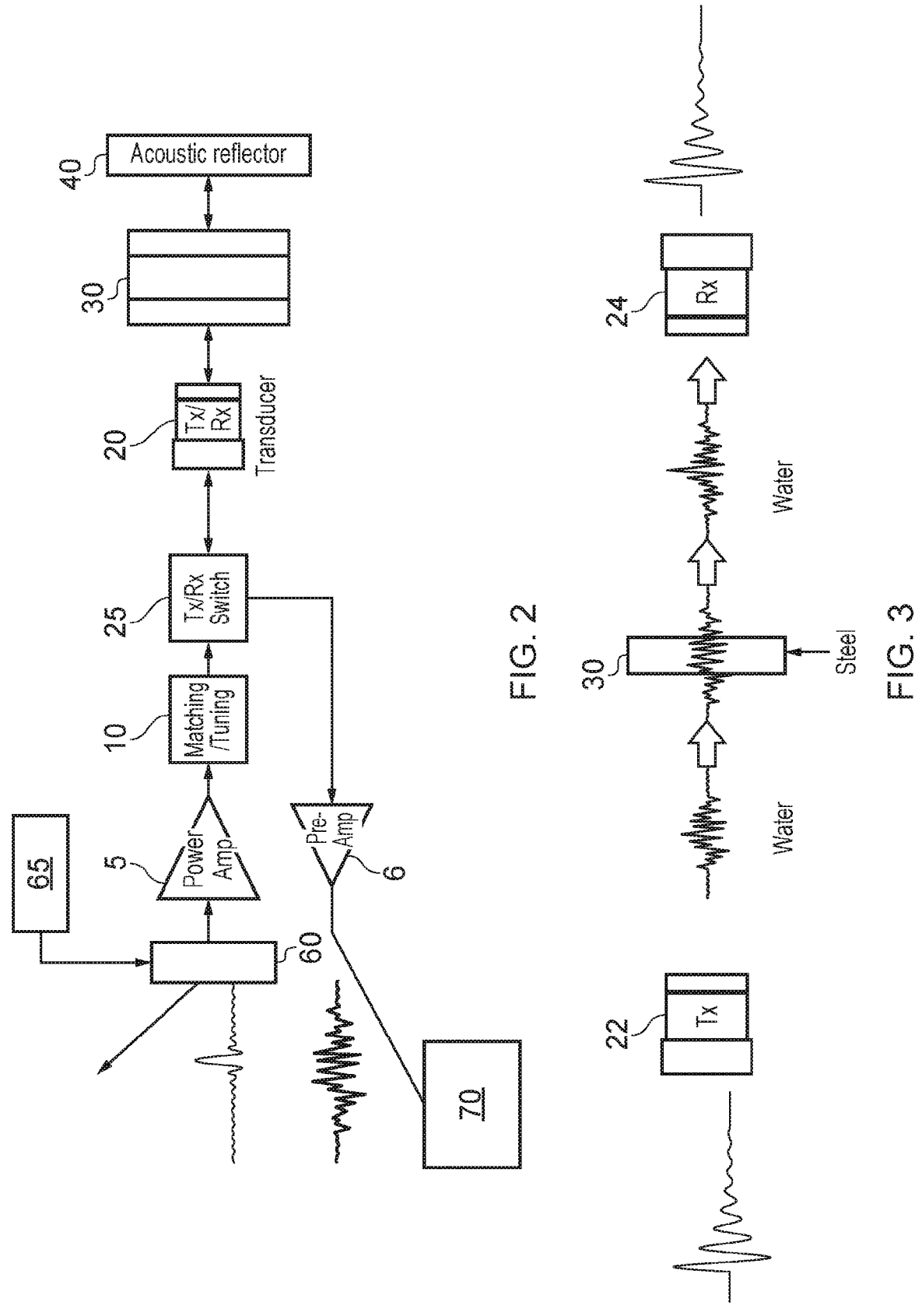
FIG. 2 shows an analysing device according to an embodiment.
FIG. 3 schematically shows distortions to a signal caused by a structure.

It should be noted that although in this embodiment transducer 22 is shown as being just a transmitter, in some embodiments, it may be configured to receive signals too in a similar way to the transducer 20 of FIG. 2. This would allow signals that pass through the target 30 in the upper embodiment to be received by receiver 24 and signals reflected by the target 30 to be received by transducer 22, the two sets of signals could then be sent to analyser 70 for analysis.

FIG. 2 shows an alternative monostatic embodiment where the transducer 20 is both a transmitter and a receiver and the target or structure to be analysed 30 is between the transducer 20 and an acoustic reflector 40. The transmitter transmits signals towards the structure and these are reflected at different interfaces within the structure, or by an acoustic reflector 40.

There is a switch 25 which controls whether the transducer 20 is transmitting or receiving and which sends the signal to be transmitted to the transducer and sends the received signal to preamplifier 6 and then to analyser 70. As in the example of FIG. 1 there is signal modifying circuitry 60. In this example, signal modifying circuitry 60 is associated only with the transmission line. Initially, control circuitry 65 controls signal modifier to apply a particular modification to the signal that is appropriate for compensating for distortions due to the hardware of the analysing device and the medium containing the target. In this regard, this modification may be in the form of a pre-distorted waveform which is stored within a database or data store within control circuitry 65 and can be applied by signal modifier. This allows target 30 to be analysed more accurately by analyser 70 as much of the degradation that might arise from the medium and the hardware of the transmitter/receiver is removed from the signal. Following analysis of the first portion of complex structure 30, control circuitry 65 will control signal modifier to apply a further pre-distortion or modification to the data, this distortion or modification being designed to remove or at least reduce the distortions that are determined to be due to the first portion of complex structure 30 allowing further portions of the structure to be analysed.

In further embodiments, depending on the complexity of the target several different distortions may be applied by signal modifier 60 to the transmitted signal in order to accurately separate out the distortions in the received signal applicable to the different portions of the complex structure. In addition to applying different signal modifications different frequency bandwidths may be used and in some embodiments different pulse waveforms as appropriate.

FIG. 3 shows schematically how an input signal transmitted by a transmitter 22 may be distorted by the medium and the single layer target 30 and output by receiver. In this embodiment, modifications are applied to the signal at the transmitter and receiver by signal modifying circuitry similar to that in FIG. 1, such that the received signal looks identical to the transmitted signal with the single layer target in place. The modifications applied that render the first steel layer acoustically transparent may have been derived from a calibration process with a known steel layer amended in response to an initial analysis of the target which may have supplied an estimated width of that layer.

Figures 4, 5:
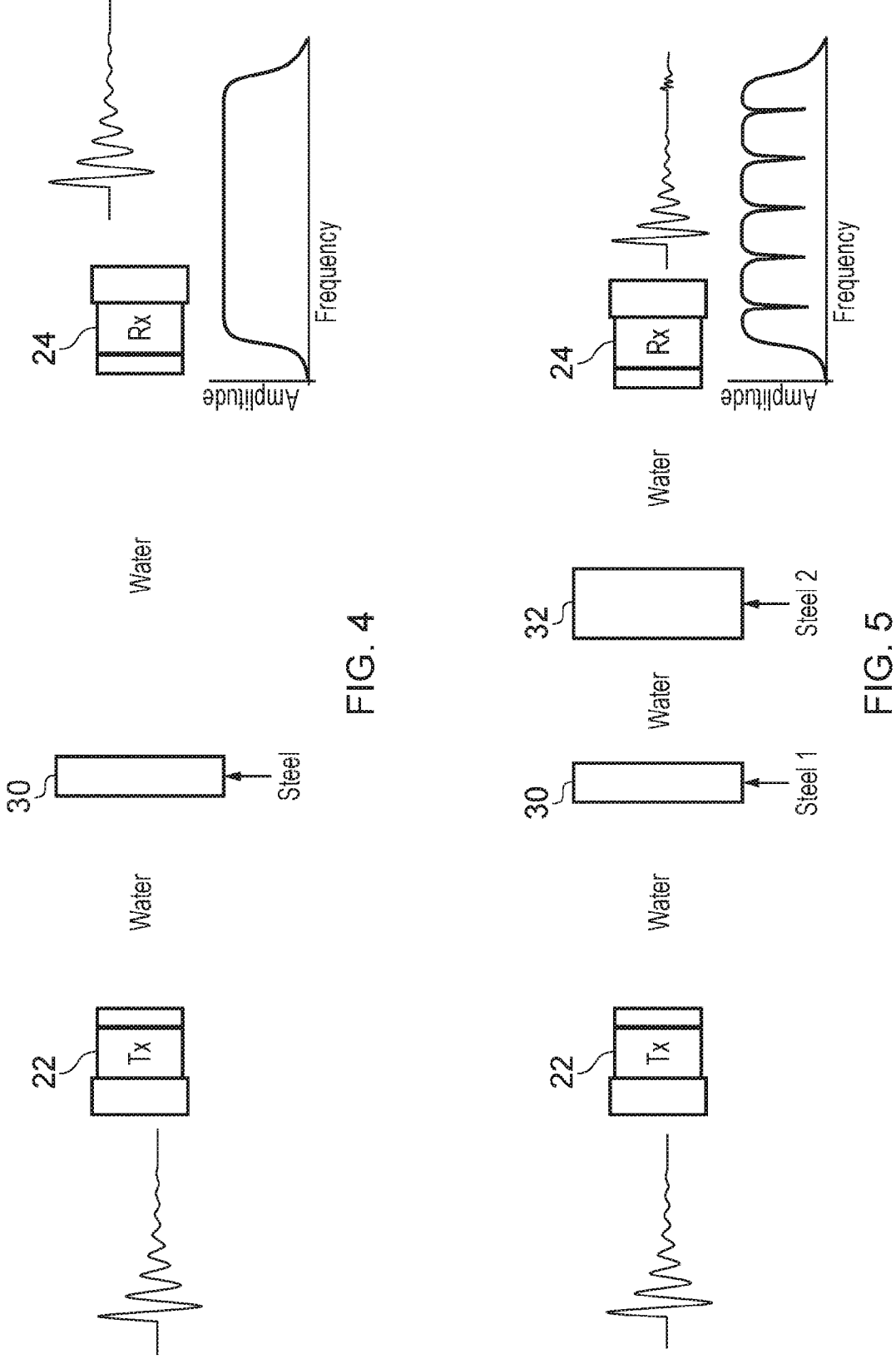
FIG. 4 shows a system where distortions are applied to a signal to render the simple target acoustically transparent.
FIG. 5 shows a more complex target with a first and second structure to be analysed.

These modifications provide what could be seen as a blank sheet and any differences during analysis of a further portion of the target if these signal modifications are used will be due to that further portion. FIG. 4 shows how the received signal is uniform across the frequency bandwidth.

FIG. 5 shows how an additional steel plate or layer 32 inserted into the medium results in a distortion of the original pulse. This distortion includes the back wall resonances of the second steel plate which can be seen in the frequency domain as resonances, from which the thickness can be resolved:

$$T = c/(2 \times f_0)$$

Where:
  T=Thickness
  C=Speed of sound
  $F_0$=Fundamental frequency (frequency of the first null, or frequency of a peak where a FFT of a later part of the signal is taken).

In effect the frequencies within the bandwidth that resonate in layer 32 are reduced in amplitude at the receiver allowing an analyser to determine the thickness of layer 32.

Figure 6:
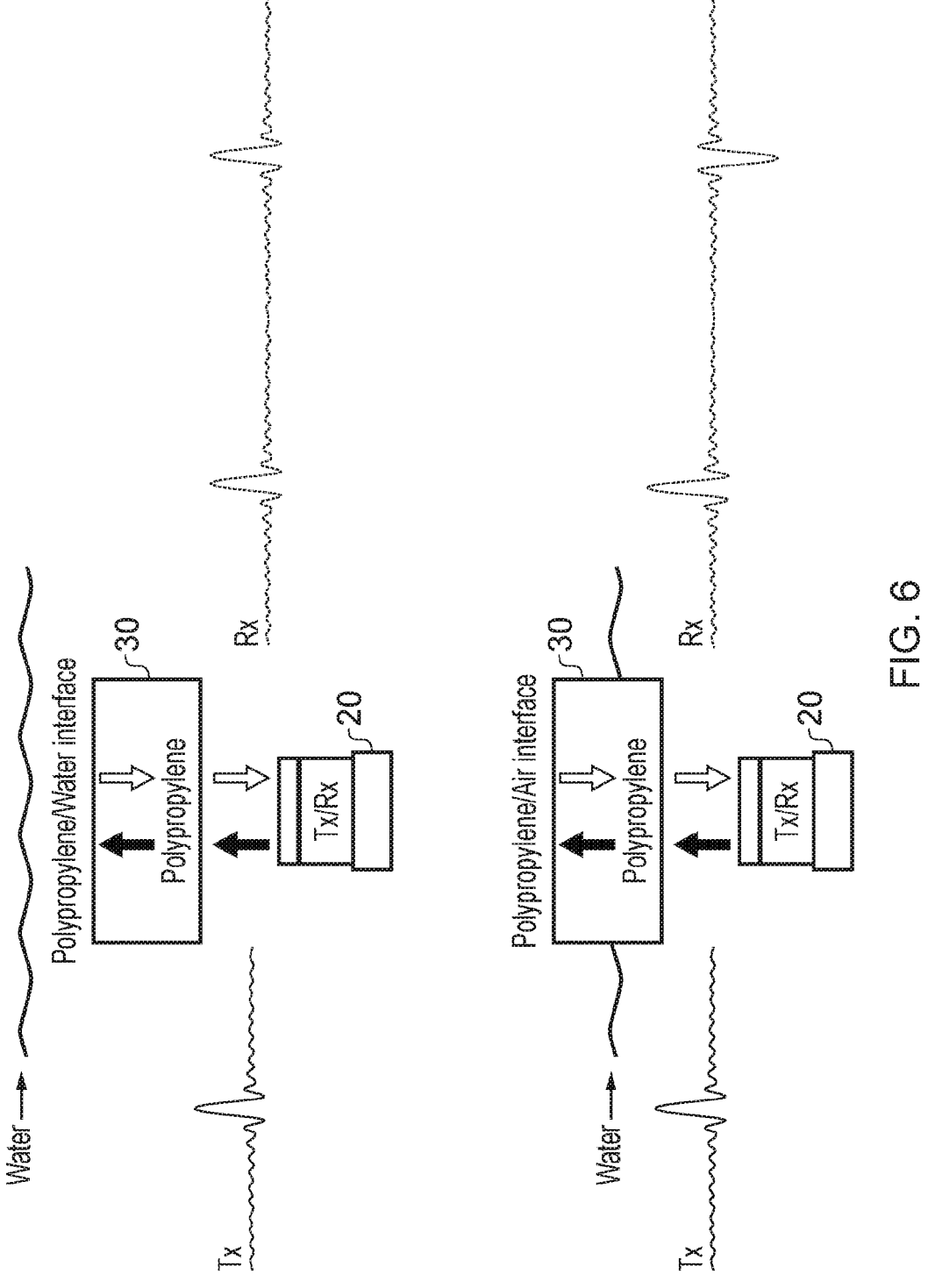
FIG. 6 shows schematically how different surfaces can be identified.

FIG. 6 shows a further example of how distortions in a signal can also be used to determine different interfaces within a structure. One potential use of this technique is in the oil and gas sector and in particular, the analysis of structures within a borehole. In this situation the detection of wet and dry interfaces is critical as it may be indicative of the disbondment of coatings on tubing surfaces.

FIG. 6 shows an approximation of a polypropylene pipe coating being inspected externally in an underwater environment to determine whether or not there is a breach in the coating.

The upper figure shows that where the acoustic impedance (Z) of polypropylene (1.63 MRayl) and water (1.45 MRayl) are close to each other, the returned signal is in phase with the transmitted sinc pulse, however, the very different acoustic impedance interface of polypropylene (1.63 MRayl) and air (0.00043 MRayl) gives rise to an inversion of the interface reflection indicating dryness behind the polypropylene coating.

Calculation of the reflection coefficients (R) confirm that this is an expected result:

From $$R = \frac{Z_2 - Z_1}{Z_2 + Z_1}$$

Where R ranges from |0| to |1|;

Polypropylene (Z1) and Water (Z2)=+−0.058<small magnitude, hence no change; and

Polypropylene (Z1) and Air (Z2)=−0.999<−near |1|, hence inversion.

This ability to detect an inverted signal allows the material on the surface of a target to be analysed, and wear in coatings to be identified.

In this embodiment a well-defined signal such as a sinc pulse is used and where the coating to be inspected is behind other layers of the structure, these can be analysed first and distortions used such that modifications to the sinc pulse can be determined to be due to the coating and not the intermediate layers of the structure. In other embodiments, other waveforms can be used and inversion detection used through post processing processes (eg. cross-correlation).

In some embodiments, the transducer is configured to increase the beamwidth or spot size transmitted. One aspect that affects transducer acoustic spot size is frequency. The bandwidth emanating from a transducer is not conventionally wide enough to affect this at low stand-off distances, however in some embodiments a wide bandwidth and a wider aperture range on the acoustic spot size is provided and this can have advantageous effects particularly for the analysis of holes or defects in a structure. Based on the formula for transducer beamwidth:

$$\alpha = 2\left[\sin^{-1}\left(1.2 \times \frac{c}{fD}\right)\right]$$

Figure 7A:
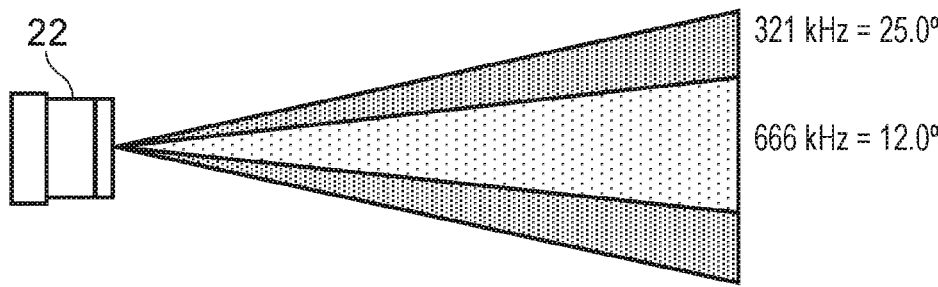
FIGS. 7a and 7b show differences in beamwidth after predistortion of transmit signal.
Figure 7B:
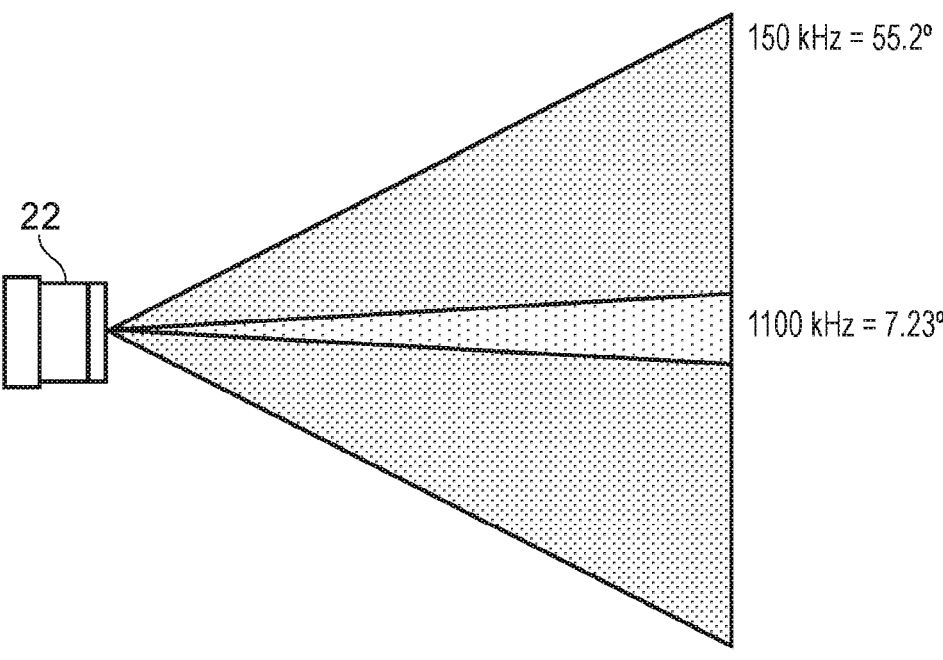

Based on a transducer with a frequency response as in FIGS. 7a and 7b with an element diameter of 25 mm (D=0.025 m) and equalised to exhibit an acoustic bandwidth in water (c=1448 m/s) of 150 kHz to 1100 kHz (f1 and f2), the maximum and minimum beam angles are 55.2° and 7.2° respectively.

As can be seen after equalisation once the bandwidth has been increased through transducer optimisation (matching, tuning and/or signal distortion), the transducer acoustic spot size is wider at the lower end of the bandwidth and narrower at the higher end of the bandwidth.

Using a constant amplitude, wide bandwidth signal for defect measurement as shown in FIG. 8, defect or hole sizing can be performed by analysing the varying nature of the reduction of acoustic spot size with increase in frequency.

Looking at FIG. 8 and using an equalised transducer system that has a flat bandwidth between fmin and fmax, there are no obstructions and so all of the energy can reach the receiver and so the graph shows full optimised bandwidth at equal amplitude throughout.

FIG. 9 depicts the same transducer setup, but with an obstacle that has a small hole preventing low and medium frequencies passing through, but high frequency components of the transducers optimised bandwidth are able to pass through.

The transducer 24 receives the HF elements (orange trace, showing amplitude increasing with frequency up to frequency a on the opposing graph) while, the transducer 22 (in receive mode) receives the LF/MF elements (blue trace showing amplitude decreasing above frequency a on the opposing graph) that have been reflected from the target because they don't fit through the hole.

Adding the band of frequencies received by each receiver together (blue and orange, both traces), completes the full transmit bandwidth, showing the cross-over point at α.

Using the same setup, but with a larger hole in the obstruction (FIG. 10), shows the cross-over point, a moving down the frequency band due to more frequency content passing through the hole.

Knowing the Tx transducer beam profile at a particular stand-off (distance between transmitter and target), the size of the hole can be determined by comparing cross-over frequency, a with the acoustic spot size on the beam profile plot and some use of trigonometry if the beam profile plot was taken at a different stand-off to that used in the test.

Thus, it may be advantageous to provide a transducer with a conical sonic shape with low frequencies occupying the outside of the cone and high frequencies, the inner. In some embodiments, where there is a defect such as a cavity rather than a hole then a difference in time between receipt of reflected beams of different bandwidths can be used in a similar way to determine both the diameter and the depth of the defect.

Figure 11:
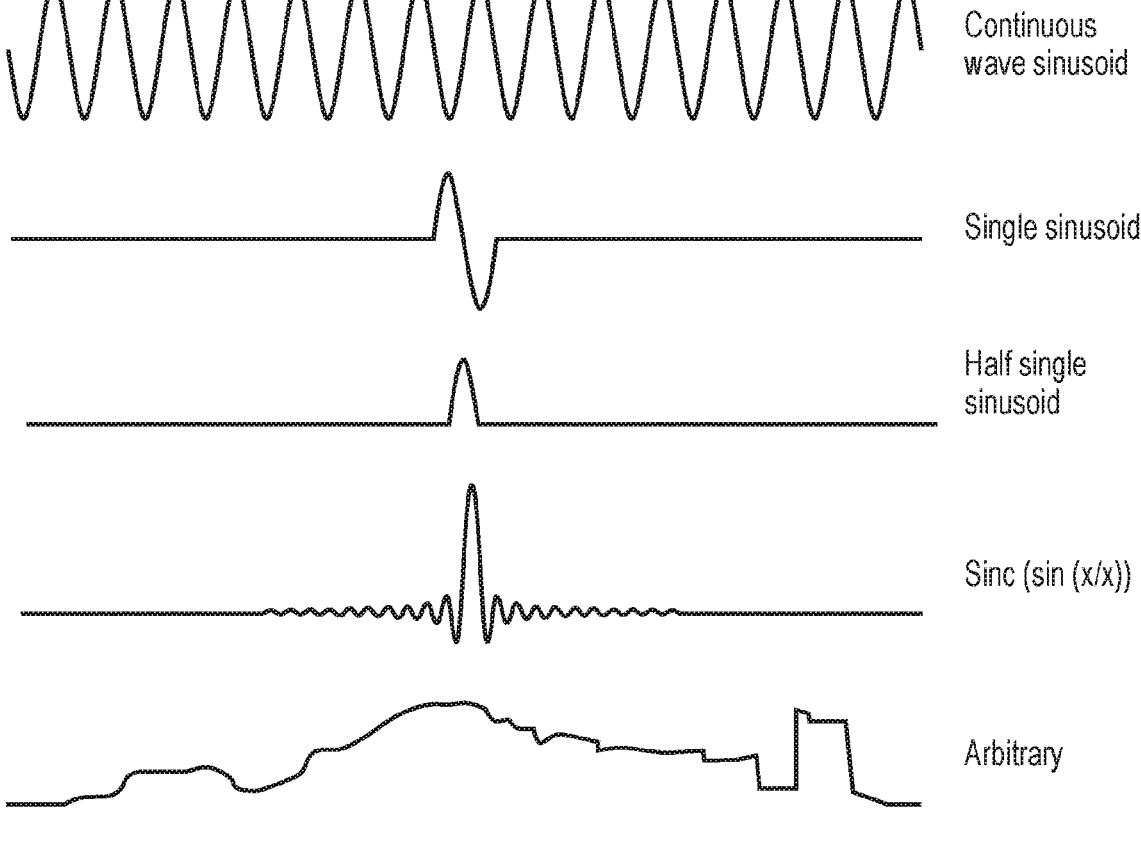
FIG. 11 shows examples of different waveforms that may be used as a transmitted beam.

FIG. 11 shows different wave forms that may be used as the basis for the transmitting signal in analysis. The nature of the process enables the Tx/Rx system to be calibrated or optimised for any waveform. For example, single sinusoids/half sinusoids, sinc, arbitrary etc. Different waveforms may be selected to analyse different portions of a complex structure, depending on whether higher energy or more exact measurements are required.

Figure 12:
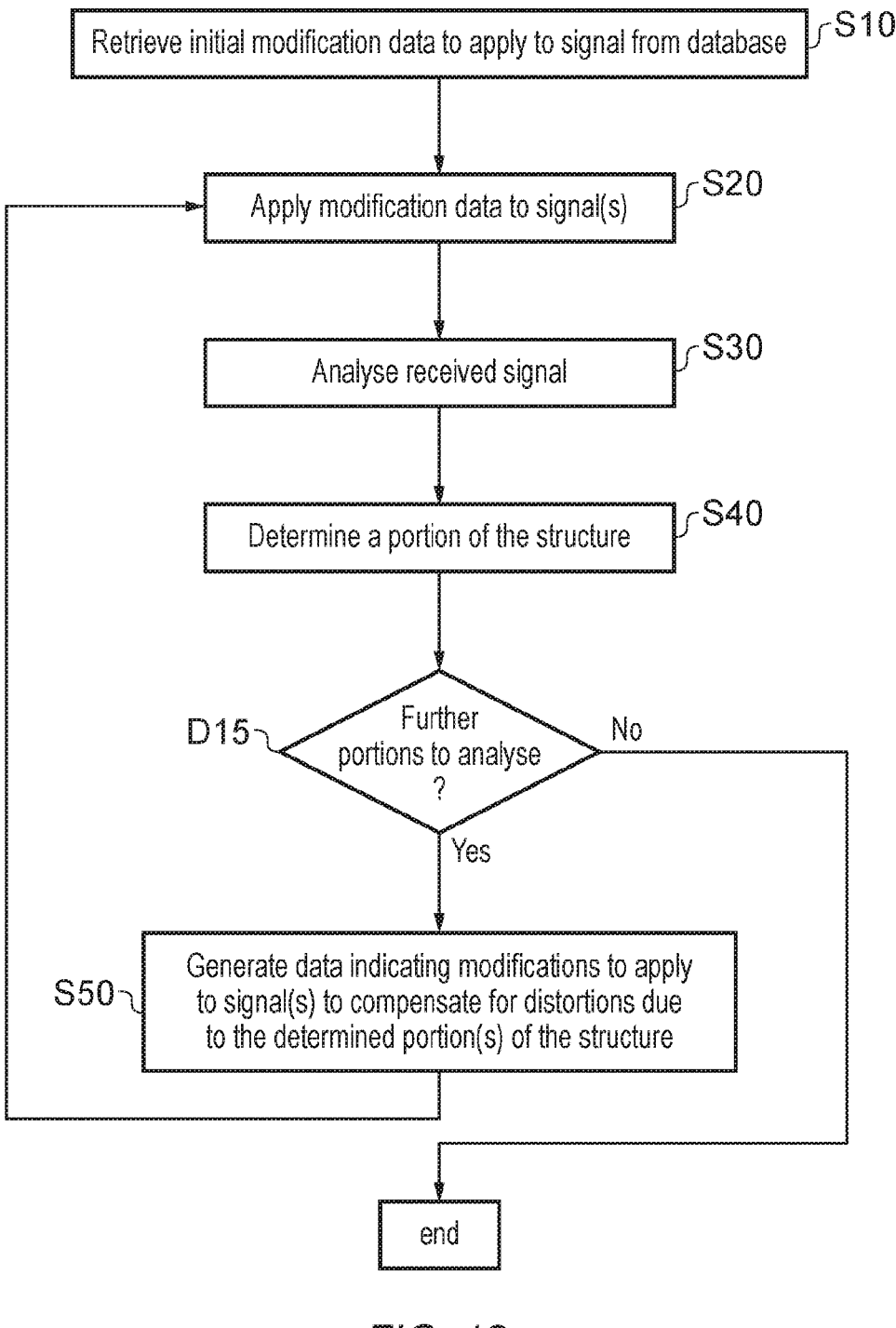
FIG. 12 schematically shows a flow diagram illustrating steps in a method according to an embodiment.

FIG. 12 schematically shows a flow chart illustrating steps of a method according to an embodiment.

At step S10 initial modification data to apply to the signal is retrieved from a data base or data storage. This may be a pre-distorted waveform to apply to the transmitter, or it may be indicative of modifications to apply to the transmitter and/or receiver signal. Then at step S20 the modification data is applied to one or more of the transmitted and/or received signals. This modification data may be modifications to modify one or more of the phase and amplitude of the signals.

The signal is received at the receiver and sent to an analyser where it is analysed at step S30. A first portion of the structure is determined from this analysis. In this regard, distortions in the received signal when compared to the transmitted signal are indicative of the structure as distortions due to the hardware of the transmitting and receiving devices and the medium have been compensated for by the applied initial modification data. Thus, the first portion of the structure is the predominant source of any distortions in the data, and details of the structure such as dimensions and/or defects may be determined from the signal received. In some cases there is prior information regarding the expected structure and it is the additional details that are retrieved from the signal.

Once this portion of the structure has been determined at step S40 it is then determined whether or not there are further portions to analyse at step D15, if there are then it is determined what modification data should be applied to the signal to in effect render the first portion that is the predominant source of distortion in the original signal acoustically transparent, allowing the other portions to be more readily analysed.

The generated modifications are then applied to the signal and the next portion of the structure is analysed, and the steps are repeated, until it is determined at step D15 that there are no further portions to analyse and the process ends.

In some embodiments at S50 in addition to generating data indicating modifications to be applied, the preferred frequency bandwidth of the signal may be determined which may be based on the expected dimensions of the subsequent portion, and in some embodiments the preferred shape or waveform of the signal to be transmitted may also be determined based on the expected nature of the subsequent portion of the structure to be analysed.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" or "control circuitry" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although illustrative embodiments of the disclosure have been disclosed in detail herein, with reference to the accompanying drawings, it is understood that the disclosure is not limited to the precise embodiment and that various changes and modifications can be effected therein by one skilled in the art without departing from the scope of the disclosure as defined by the appended claims and their equivalents.

What is claimed is:

1. A device for analyzing structures within a medium, the device comprising:
   at least one acoustic signal transmitter and acoustic signal receiver configured to output an acoustic signal and to receive an acoustic signal;
   an analyzer configured to analyze received acoustic data;
   a signal modifier configured to modify at least one of a phase and amplitude of said acoustic signal at least one of said acoustic signal transmitter and acoustic signal receiver;
   control circuitry for controlling analysis of said structure, said control circuitry being configured to:
   initiate analysis of a first portion of said structure by controlling said signal modifier to apply a signal modification to at least one of said acoustic signal transmitter and acoustic signal receiver to modify an acoustic signal according to first modification data; and
   initiate analysis of further portion of said structure by controlling said signal modifier to apply a signal modification to at least one of said acoustic signal transmitter and acoustic signal receiver to modify an acoustic signal according to further modification data.

2. The device according to claim 1, said signal modifier being configured to apply a signal modification to both said acoustic signal transmitter and said acoustic signal receiver.

3. The device according to claim 1, wherein said further modification data is configured to mitigate for distortions of said acoustic signal caused by said first portion of said structure.

4. The device according to claim 1, said control circuitry being configured to control analysis of a plurality of further portions of said structure by controlling said signal modifier to apply a signal modification to at least one of said acoustic signal transmitter and acoustic signal receiver to modify an acoustic signal according to a plurality of different modification data.

5. The device according to claim 1, wherein said signal modifications comprise modification of both said amplitude and said phase of said acoustic signal.

6. The device according to claim 1, wherein said control circuitry is configured to control said acoustic signal transmitter to generate a first acoustic signal within a first frequency bandwidth during analysis of said first portion of said structure; and control said acoustic signal transmitter to generate a further acoustic signal within a further frequency bandwidth during analysis of said further portion of said structure.

7. The device according to claim 1, wherein
   said analyzer is configured to identify an interface within said structure from a reflected signal and to determine a nature of said interface from whether said reflected signal has an amplitude inversion or not.

8. The device according to claim 1, wherein said control circuitry is configured to generate a sinc pulse as an initial waveform to be transmitted by said transmitter prior to any signal modifications.

9. The device according to claim 1, wherein said acoustic signal transmitter is configured to generate a conical beam having a frequency bandwidth, lower frequencies of said bandwidth occupying the outer edges of said conical beam and higher frequencies occupying a central section.

10. The device according to claim 1, wherein said analyzer is configured to analyze said received acoustic data to determine at least one of a frequency bandwidth of a signal transmitted through a portion of said complex structure and a frequency bandwidth of a signal reflected by said structure, and to determine a size of a defect or hole in dependence upon said at least one of said transmitted and received frequency bandwidths.

11. The device according to claim 10, wherein said analyzer is configured to analyze a signal reflected by said structure and to determine a depth of said defect in dependence upon at least one of a time taken for different portions of said reflected signal to be received and a phase response of said reflected signal.

12. The device according to claim 1, wherein said control circuitry is configured to initiate analysis of said first portion of said complex structure by inputting a first pulse waveform to said transmitter as a basis for a first acoustic signal; and to initiate analysis of said further portion of said complex structure by inputting to said transmitter a further pulse waveform as a basis for a further acoustic signal, said further pulse waveform being different to said first pulse waveform.

13. A method of analyzing a structure within a medium, the method comprising:

transmitting a first acoustic signal towards said structure through said medium;

receiving said first acoustic signal;

modifying at least one of a phase or amplitude of said first acoustic signal at at least one of a transmitter and a receiver by applying first modification data; and analyzing a first portion of said structure by analyzing said received signal; and transmitting a further acoustic signal towards said structure through said medium;

receiving said further acoustic signal;

modifying at least one of a phase or amplitude of said further acoustic signal at at least one of said transmitter and said receiver by applying further modification data; and analyzing a further portion of said structure by analyzing said received signal.

14. The method according to claim 13, wherein said steps of modifying at least one of a phase or amplitude of said first or further acoustic signal comprises modifying both said phase and amplitude.

15. The method according to claim 13, wherein said steps of modifying at least one of a phase or amplitude of said first or further acoustic signal at at least one of said transmitter and said receiver, comprises modifying at least one of a phase or amplitude of said first or further acoustic signal at both of said transmitter and said receiver.

16. The method according to claim 13, wherein said further modification data is configured to mitigate for distortions of said acoustic signal caused by said first portion of said structure.

17. The method according to claim 13, comprising further steps of applying further modification data to at least one of said acoustic signal transmitter and acoustic signal receiver to analyze further portions of said structure.

18. The method according to claim 13, wherein said first acoustic signal is generated within a first frequency bandwidth during analysis of said first portion of said complex structure; and said further acoustic signal is generated within a further frequency bandwidth during analysis of said further portion of said complex structure.

19. The method according to claim 13, wherein said step of analyzing comprises identifying an interface within said complex structure from a reflected signal and determining a nature of said interface from whether said reflected signal has an amplitude inversion or not.

20. The method according to claim 13, comprising:

determining a size of a defect within said structure from at least one of a frequency bandwidth of a signal reflected by said structure and transmitted through said structure.

* * * * *